Oct. 4, 1966     J. DECKER     3,276,278
RELEASABLE ONE WAY DRIVE MECHANISM
Filed Sept. 14, 1964

INVENTOR.
JACOB DECKER

BY Howard Keiser
& Jack J. Carl
ATTORNEYS 3,276,278
RELEASABLE ONE WAY DRIVE MECHANISM
Jacob Decker, Cincinnati, Ohio, assignor to The Cincinnati Milling Machine Co., Cincinnati, Ohio, a corporation of Ohio
Filed Sept. 14, 1964, Ser. No. 396,285
6 Claims. (Cl. 74—144)

This invention relates to overrunning or one way drives and more particularly to a ratchet and pawl type mechanism adaptable to provide a one way transmission for incremental rotation of a shaft.

Incremental or one way drive transmissions using ratchet and pawl mechanisms are common in many mechanisms and have proved to be extremely satisfactory where the desired size of incremental rotation remains constant or is some multiple or even division of the spacing of the teeth of the ratchet wheel. Drives where the incremental rotation is to be infinitely adjustable often use a sprag type clutch mechanism since the increments are not dependent upon tooth spacing. In some applications, for example, precision grinder pick feeds, and infinitely variable one way drive mechanism is desired only part of the time and at other times the driven shafts must be freely rotatable in either direction by other means. In these cases, the ratchet and pawl mechanisms which are adjustable for limited increments can be used by adapting the pawl for selected removal from the ratchet wheel but the infinitely variable sprag type clutches are not readily adaptable for release to allow free rotation of the shaft in either direction.

It is therefore an object of this invention to provide an overrunning drive transmission which combines the releasability of ratchet and pawl mechanisms and the infinite adjustment of sprag type clutches.

It is a further object of this invention to provide an easily released one way drive mechanism to permit free shaft rotation in either direction by other means without interference by the one way transmission.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form this invention includes a firm but resilient band of material mounted on the shaft to be driven. A pawl is swingably mounted in a housing that is rotatable with respect to the shaft and which has one end adapted to engage the resilient band when the pawl is swung in one direction in the housing. A reciprocating drive is connected directly to the pawl at its other end and is operated to swing the pawl in the one direction to engage the resilient band at which time the swing of the pawl is stopped and the housing and shaft are locked together. Continued operation of the drive tending to swing the pawl further in the one direction then results in rotation of the shaft and housing in unison. A reversal of the drive swings the pawl away from the resilient band to release the housing from the shaft and a stop is provided in the housing to prevent a swing of the pawl beyond a preset distance away from the band. Continued drive in the reverse direction rotates the housing with respect to the shaft and moves it back to its starting position. By maintaining the pawl against the stop, the shaft is free to rotate in either direction with respect to the housing and the pawl. A clear understanding of the invention can be obtained from the following detailed description in which reference is made to the attached drawings wherein:

Figures 1, 2:
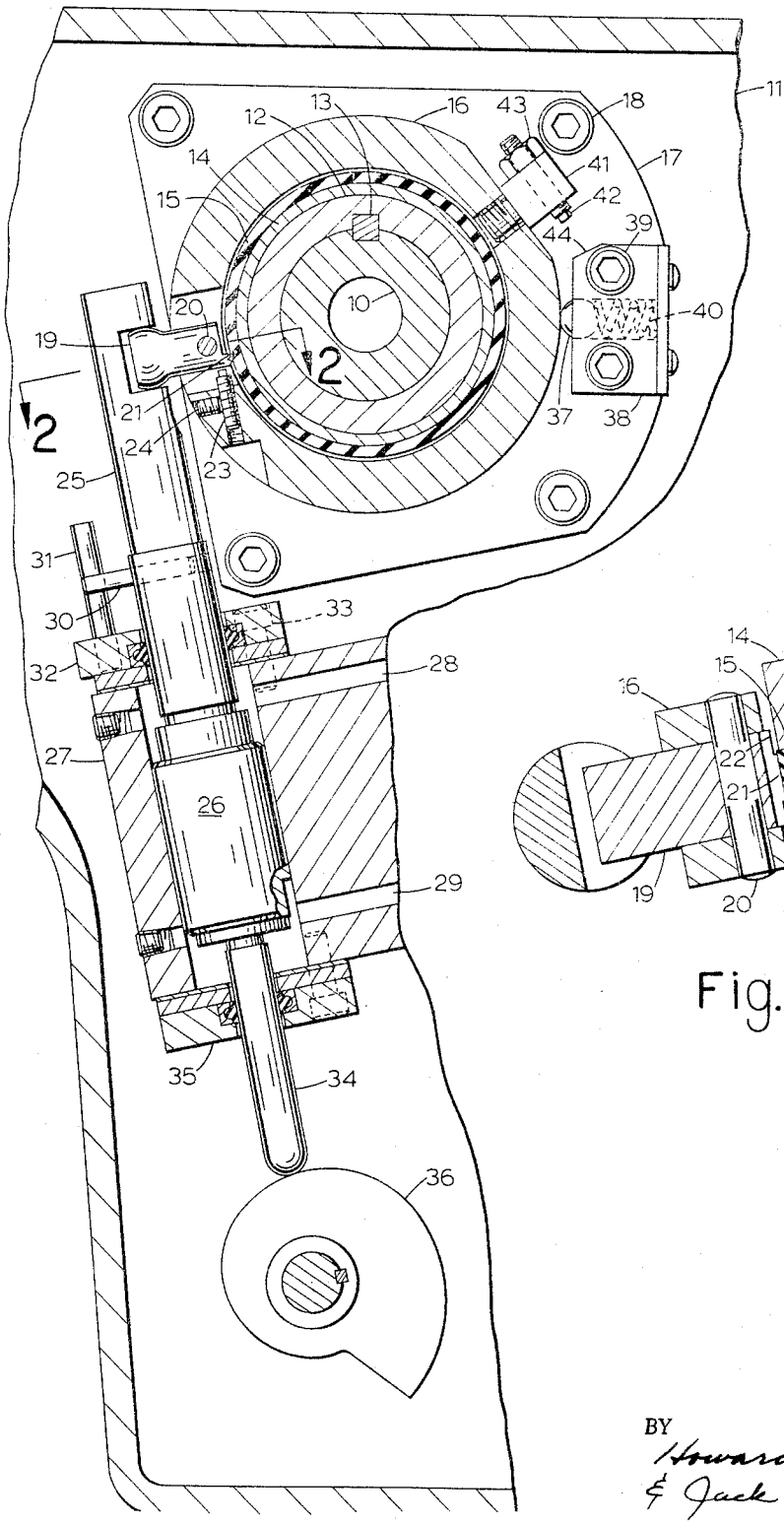
FIG. 1 is a cross section through the one way drive mechanism of this invention.
FIG. 2 is a partial section of the mechanism as viewed on the plane 2—2 through FIG. 1.

The overrunning or one way drive transmission of this invention is shown in a preferred form in FIGS. 1 and 2 adapted for inclusion in a grinding machine such as the machine shown in U.S. Patent 3,141,267. Portions of the cited patent relate to the operation and control of a pick-feed mechanism shown and described in detail which is similar to the mechanism to be described herein except for the specific clutch mechanism and therefore detailed description of the machine and control mechanism herein is omitted. With reference to the FIGS. 1 and 2 a drive shaft 10 is shown extending through a machine base 11 and the shaft 10 is provided to drive the grinder cross feed mechanism described in the cited patent. It is intended that the shaft 10 be rotated by one of two mechanisms and one of the mechanisms, not shown herein, enables a constant rotation of shaft 10 to provide a constant slow infeed movement of the grinding machine wheelhead. The other mode of rotation of the shaft 10 contemplates its incremental movement angularly to provide a series of small step movements of the same wheelhead. It is for this latter purpose that the incremental motion transmission of this invention is furnished and since the shaft 10 is intended also to be rotated upon occasion in the previously mentioned continuous mode of rotation, the incremental motion transmission of this invention must be releasable so as not to interfere with the constant rotation of the shaft 10.

The incremental motion mechanism specifically shown and described herein includes a sleeve 12 that is received over the shaft 10 and is rendered rotatable with that shaft by a key 13. The sleeve 12 further has an annular ring member 14 received around its outside diameter and the ring 14 is made to fit firmly on the sleeve 12 so as to be fixed with respect thereto. The ring member 14 has formed therein an annular slot or groove extending around its outside near the central portion thereof. A resilient band 15 is cemented in the member 14 so as to be fixed and not rotatable relative to that member. The band 15 is composed of a resilient material such as a firm rubber or plastic which is deformable under pressure but which returns to its original shape when the deforming pressure is removed therefrom. In the form shown, the band 15 is annular and extends completely around the member 14 and has a cylindrical or smooth outside surface. It is the function of this resilient band 15 to act as the ratchet wheel in the transmission mechanism of this invention.

A housing 16 is received around the shaft 10 and over the band 15. The housing 16 is supported from a bracket 17 and is rotatable therein so that it is also rotatable with respect to the shaft 10 and to the machine base 11. The bracket 17 is fixed to the machine base 11 by machine screws 18. The shaft 10, of course, extends through the bracket 17 is fixed to the machine base 11 by machine mechanism for the described transmission is included in the housing 16. A pawl member 19 is therefore journalled over a pin 20 that is fixed in the housing 16 and the pawl 19 is freely rotatable over the pin 20. The pin 20 extends in the housing 16 parallel to the axis of the shaft 10. An end 21 of the pawl 19 is adapted to engage against the resilient band 15 when the pawl 19 is swung counterclockwise on the pin 20 as viewed in FIG. 1. The end 21 of the pawl 19 is formed with teeth so that when it is forced against the resilient band 15 that band will be deformed to correspond to the teeth and to provide a firm grip between the pawl 19 and the band 15 by which the rotational drive to the shaft 10 is transmitted. As shown best in FIG. 2, the end 21 of the pawl 19 includes a shoulder area 22 on each side of the toothed section thereof. It is the function of the shoulder areas 22 to engage against the member 14 on either side of the band 15 to prevent permanent damage in a form of cuts to be inflicted upon the band 15 as a result of excess pressure thereon when excessive resistance to rotation of the shaft 10 occurs. The pawl 19 is also rotatable or swingable in the housing 16 in the clockwise direction to move the end 21 away from the band 15 to release the shaft 10 for movement independent of movement of the housing 16 and the pawl 19. Clockwise rotation of the pawl 19 in the housing 16 is limited by a stop member 23 that is adjustably threaded into the housing 16 in close proximity to the pawl 19 and is locked in place by a set screw 24. The stop 23 is positioned so that the pawl 19, when swung clockwise in the housing 16 to the position shown, is stopped in a position with the end 21 just clearing the band 15 by a preset small amount. The preset distance between the end 21 and the band 15 when the pawl 19 is engaged against the stop 23 represents a small amount of lost motion in the pawl between the driving and release conditions of the transmission.

As shown in FIG. 1 the outer end of the pawl 19 is in the form of a bell end and the power for operation of the transmission of this invention is connected directly through the pawl 19 at this bell end portion. For this purpose a drive member 25 in the form of a piston rod is engaged over the end of the pawl 19. The piston rod 25 is reciprocally movable in a direction generally transverse to the longitudinal dimension of the pawl 19 and in a direction that is generally tangential to the housing 16. The piston rod 25 is connected to a piston 26 that is slidably received inside of a cylinder member 27. The piston 26 is caused to reciprocate in the cylinder member 27 by the selected connection of fluid under pressure to the passages 28 and 29 that extend through the cylinder member 27. The manner of the connection of fluid under pressure to these passages 28 and 29 is described fully in detail in the previously cited U.S. patent and further detail in this regard is not included herein. To prevent rotation of the piston 26 and rod 25 a pin 30 is fixed in the piston rod 25 and extends laterally therefrom where it is embraced by a pair of rail members 31 (only one shown in FIG. 1) these rails 31 being fixed in a cap member 32 that is secured on top of the cylinder member 27 by machine screws 33. The lower end of the piston 26 has a finger member 34 extending therefrom and through a cap 35 that closes the end of the cylinder member 27 opposite the cap 32. The finger 34 is adapted to engage against a cam 36 whose outer surface is in the shape of an Archimedean spiral and which is angularly adjustable to provide a stroke length adjustment for the piston 26.

With the mechanism as shown in FIG. 1, fluid under pressure is connected at the passage 28 while the passage 29 is connected to return pressure. Therefore the piston 26 is urged downward and the finger 34 is engaged against the cam 36. This is the condition at the end of an incremental rotation of the shaft 10. At this time the pawl 19 has been swung to a position so that the end 21 is engaged against the band 15 to grip it and to render the housing 16 and the shaft 10 rotatable in unison. Upon the connection of fluid under pressure to the passage 29 and the connection of the passage 28 to return pressure the piston 26 will begin to move upward and will carry the piston rod 25 upward with it. The upward movement of the piston rod 25 tends to swing the pawl 19 clockwise in the housing 16. Therefore the end 21 will be swung away from the band 15 until the pawl 19 engages against the stop 23. This occurs very soon after the start of movement of the piston rod 25 and the rod 25 continues to move upward after the release of the housing 16 from the shaft 10. Since the pawl 19 can swing no further in the housing 16 the movement of the piston rod 25 results in a clockwise or resetting motion of the housing 16 with respect to the shaft 10 and the bracket 17 and machine base 11. To insure that the housing 16 will not begin to rotate in the clockwise direction before the pawl 19 has swung clockwise therein and has released itself from the band 15, a drag is imposed on the housing 16 by a ball 37 that is supported in a member 38 which is fixed on the bracket 17 by machine screws 39. The ball 37 is forced outward from the member 38 by a spring 40 that is compressed behind the ball 37. Therefore as the piston rod 25 begins its upward travel from the position shown, the pawl 19 is first swung clockwise against the stop 23 before the housing 16 begins to move and overcome the drag imposed by the ball 37 being engaged against its side with the pressure of the spring 40. The clockwise or reset motion of the housing 16 must be stopped before the piston rod 25 has moved upward to the position at which the piston 26 would be received against the upper end of the space in the cylinder member 27. To insure that the piston is stopped prior to its full stroke length, a member 41 is fixed to extend radially from the housing 16 and carries a stop member 42 that is adjustably positioned in the member 41 and locked in place by a nut 43. The stop 42 is adapted to engage against a surface 44 on the member 38 that is fixed on the bracket 17. Therefore the piston rod 25 continues to urge the housing 16 in the clockwise direction after engagement of the stop 42 against the surface 44 and this holds the pawl 19 rotated to its clockwise position in which it bears firmly against the stop 23 and insures that in this condition the shaft 16 is released to rotate freely in either direction with respect to the housing 16 and pawl 19.

The connection of fluid under pressure at the passage 28 after the pressure has been connected to the passage 29 results in a downward movement of the piston 26 toward the position shown in FIG. 1. When this occurs the pawl 19 is rotated counter-clockwise away from the stop 23 and the end 21 is swung into firm engagement with the resilient band 15. The pawl 19 then can swing no further in the housing 16 and as the piston 26 and piston rod 25 continue their downward movement toward the position shown, the housing 16 is caused to rotate in the counter-clockwise direction. Since the pawl 19 is engaged against the band 15, the shaft 10 is locked to the housing 16 and is also rotated in the counterclockwise direction with the housing 16. Rotation of the shaft 10 and housing 16 in the counter-clockwise direction continues until the finger 34 engages against the cam 36. This cam 36 and its angular setting determine the length of downward stroke of the piston 26 and piston rod 25 and therefore also determines the incremental rotation of the shaft 10 and housing 16 produced by a single downward movement of the piston rod 25.

It can be seen from the foregoing detailed description that the shaft 10 is rotated incrementally in the counter-clockwise direction as the piston 26 is reciprocated up and down in the cylinder member 27. After each return movement of the housing 16 in the clockwise direction to the position in which the stop 42 is engaged against the fixed stop 44, the housing 16 is released from the shaft 10 and the pawl 19 is maintained against the stop 23 so that the shaft 10 is free to rotate in either direction with respect to the housing 16. Since the incremental motion is determined by the setting of the cam 36 and since the surface thereof is a smooth spiral, the adjustment of the incremental movement produced through the transmission mechanism described is infinitely variable between the limits established by the surface of the cam and the length of stroke of the piston in the cylinder member 27. Therefore the invention described provides a releasable over-running transmission mechanism which is infinitely adjustable for the amount of rotation provided in the one direction of drive. While the invention has been described in connection of possible form or embodiment thereof it is to be understood that the present disclosure is illustrative rather than restrictive and that changes and modifications may be made without departing from the spirit of the invention or the scope of the claims which follow.

What is claimed is:

1. An overrunning transmission for incrementally rotating a shaft in one direction comprising:
    (a) a resilient band fixed to the shaft and extending therearound,
    (b) a housing rotatably supported over the shaft at said band,
    (c) a pawl swingably mounted in said housing and having one end adapted to engage forcibly against said band when said pawl is swung in one direction relative to said housing and to move away therefrom when swung in the other direction,
    (d) a stop fixed in said housing and adapted to engage said pawl for limiting the swing thereof in said other direction when said one end is a predetermined distance away from said band, and
    (e) drive means connected to said pawl and adapted for reversible swinging movement thereof in one and the other directions in excess of the distance of swing between engagement of said one end with said band and said stop whereby said shaft and housing are rotated in unison in one direction and said housing is rotated in the other direction.

2. An overrunning transmission for incrementally rotating a shaft in one direction comprising:
    (a) a resilient band fixed to the shaft and extending therearound,
    (b) a housing rotatably supported over the shaft at said band,
    (c) a pawl swingably mounted in said housing and having one end adapted to engage forcibly against said band when said pawl is swung in one direction relative to said housing and to move away therefrom when swung in the other direction,
    (d) a stop fixed in said housing and adapted to engage said pawl for limiting the swing thereof in said other direction when said one end is a predetermined distance away from said band,
    (e) a drive member connected to said pawl and adapted for reversible stroking movement, said drive member operable in one direction of movement to swing said pawl in said one direction to engage said band and lock said housing and shaft together, said pawl thereafter operating to transmit forces to rotate said housing and shaft in unison, and said drive member operable in the other direction of movement to swing said pawl in said other direction to engage said stop and release said housing from said shaft and to reversely rotate said housing, and
    (f) means for reversibly stroking said drive member in said one and the other directions.

3. An overrunning transmission for incrementally rotating a shaft in one direction comprising:
    (a) a resilient band fixed to the shaft and extending therearound,
    (b) a housing rotatably supported over the shaft at said band,
    (c) a pawl swingably mounted intermediate to its ends in said housing and having one end adapted to engage forcibly against said band when said pawl is swung in one direction relative to said housing and to move away therefrom when swung in the other direction,
    (d) means for limiting the movement of said pawl into said resilient band to prevent excessive deformation thereof,
    (e) a stop fixed in said housing and adapted to engage said pawl for limiting the swing thereof in said other direction when said one end is a predetermined distance away from said band,
    (f) a drive member connected to said pawl and adapted for reversible stroking movement, said drive member operable in one direction of movement to swing said pawl in said one direction to engage said band and lock said housing and shaft together, said pawl thereafter operating to transmit forces to rotate said housing and shaft in unison, and said drive member operable in the other direction of movement to swing said pawl in the other direction to engage said stop and release said housing from said shaft and to reversely rotate said housing, and
    (g) means for reversibly stroking said drive member in said one and the other directions.

4. An overrunning transmission for incrementally rotating a shaft in one direction comprising:
    (a) a resilient band fixed to the shaft and extending therearound and having a smooth outside diameter,
    (b) a housing rotatably supported over the shaft at said band,
    (c) a pawl swingably mounted intermediate to its ends in said housing and having teeth formed on one end thereof for engagement against said band when said pawl is swung in one direction relative to said housing and to move away therefrom when swung in the other direction,
    (d) means for limiting the movement of said pawl into said resilient band to prevent excessive deformation thereof,
    (e) a stop fixed in said housing and adapted to engage said pawl for limiting the swing thereof in said other direction when said one end is a predetermined distance away from said band,
    (f) a drive member connected to said pawl and adapted for reversible stroking movement, said drive member operable in one direction of movement to swing said pawl in said one direction to engage said band and lock said housing and shaft together, said pawl thereafter operating to transmit forces to rotate said housing and shaft in unison, and said drive member operable in the other direction to engage said stop and release said housing from said shaft and to reversely rotate said housing, and
    (g) means for reversely stroking said drive member in said one and the other directions.

5. An overrunning transmission for incrementally rotating a shaft in one direction comprising:
    (a) a resilient band fixed to the shaft and extending therearound and having a smooth outside diameter,
    (b) a housing rotatably supported over the shaft at said band,
    (c) a pawl swingably mounted intermediate to its ends in said housing and having teeth formed on one end thereof for engaging and deforming said band when said pawl is swung in one direction relative to said housing and to move away therefrom when swung in the other direction,
    (d) means for limiting the movement of said pawl into said resilient band to prevent excessive deformation thereof,
    (e) a stop fixed in said housing and adapted to engage said pawl for limiting the swing thereof in said other direction when said one end is a predetermined distance away from said band,
    (f) a drive member connected to said pawl and adapted for reversible stroking movement, said drive member operable in one direction of movement to swing said pawl in said one direction to engage said band and lock said shaft to said housing for movement therewith in said one direction, said pawl transmitting forces to rotate said housing and shaft in said one direction, and said drive member operable in the other direction to engage said stop and release said housing from said shaft and to rotate said housing in the other direction,
    (g) means for reversely stroking said drive in said one and the other directions, and
    (h) means for adjusting the length of stroke of movement of said drive member to set a predetermined incremental shaft movement.

6. An overrunning transmission for incrementally rotating a shaft in a forward direction comprising:
   (a) a resilient band fixed to the shaft and extending therearound and having a smooth outside diameter,
   (b) a housing rotatably supported over the shaft at said band,
   (c) a pawl swingably mounted intermediate to its ends in said housing and having teeth formed on one end thereof for engaging and deforming said band when forced thereagainst during swinging movement of said pawl in one direction relative to said housing, said one end moving away therefrom when said pawl is swung in the other direction,
   (d) a stop fixed in said housing and adapted to engage said pawl for limiting the swing thereof in said other direction when said one end is a predetermined distance away from said band,
   (e) a drive member connected to said pawl and adapted for reversible stroking movement, said drive member operable in one direction of movement to swing said pawl in said one direction to engage said band and lock said housing and shaft together, said pawl thereafter operating to transmit forces to rotate said housing and shaft forward in unison, and said drive member operable in the other direction of movement to swing said pawl in the other direction to engage said stop and release said housing from said shaft and to reversely rotate said housing,
   (f) means for stopping movement of said housing in the reverse direction prior to engagement of said pawl with said stop to insure clearance between said pawl and band, and
   (g) means for reversibly stroking said drive member in said one and the other directions.

References Cited by the Examiner
UNITED STATES PATENTS 1,556,582 10/1925 Booth _____ 74—144
3,189,368 6/1965 Peterson _____ 74—114 X FRED C. MATTERN, JR., *Primary Examiner.*

F. E. BAKER, *Assistant Examiner.*